United States Patent [19]

Peterman et al.

[11] Patent Number: 4,744,307
[45] Date of Patent: May 17, 1988

[54] SAFETY FLOOR

[75] Inventors: Robert J. Peterman, Hartland; Dale Krasemann, Ft. Atkinson, both of Wis.

[73] Assignee: Spacesaver Corporation, Ft. Atkinson, Wis.

[21] Appl. No.: 25,865

[22] Filed: Mar. 16, 1987

[51] Int. Cl.$^4$ .............................................. B60L 15/00
[52] U.S. Cl. .................................... 104/295; 104/288; 200/86.5
[58] Field of Search .................. 200/86 R, 86.5, 19 A; 104/288, 295; 238/6

[56] References Cited

U.S. PATENT DOCUMENTS

| | | | |
|---|---|---|---|
| 3,596,024 | 7/1971 | Smith | 200/86.5 |
| 3,829,189 | 8/1974 | Staller | 104/295 |
| 3,957,323 | 5/1976 | Tucker et al. | 104/288 |
| 4,017,131 | 4/1977 | Camenisch | 104/295 |
| 4,455,466 | 6/1984 | Wilson | 200/86.5 |
| 4,693,184 | 9/1987 | Peterman | 104/295 |

Primary Examiner—A. Michael Chambers
Attorney, Agent, or Firm—Fuller, Puerner & Hohenfeldt

[57] ABSTRACT

A safety floor for a mobile storage system includes one or more flat panels having end brackets that overlie horizontal support surfaces on the system rails. The brackets define longitudinal troughs, in which are mounted leaf springs and safety switches. The leaf springs have lifting pins that extend through holes in the brackets to contact the rail support surfaces and resiliently supported by the panel. The safety switches also have lifter pins that extend through the bracket and that are spaced a predetermined distance above the rail support surfaces. When a person steps on the panel, the panel deflects towards the rail support surface so that a safety switch lifter pin contacts and is actuated by the rail support surface to control the mobile storage system electrical circuitry. The springs are adjustable to accommodate different panel sizes and weights while maintaining the desired distance between the safety switch lifter pins and the rail support surfaces.

11 Claims, 1 Drawing Sheet

SAFETY FLOOR

FIELD OF THE INVENTION

This invention pertains to safety apparatus, and more particularly to safety floors used with mobile storage systems.

BACKGROUND OF THE INVENTION

Various equipment has been developed to increase the safety of persons using mobile storage systems. Such equipment is desirable to prevent a carriage from starting or continuing to move when a person is in an aisle next to the moving carriage. Movable carriage control is especially important in electrically powered systems, because a carriage can then be operated from a remote location and because of the large drive forces produced by the carriage motors.

Prior safety designs for preventing start-up of a stationary electrically powered carriage and for stopping a moving carriage in response to a potential safety problem may be seen in U.S. patent application Ser. Nos. 839,966 now U.S. Pat. No. 4,693,184 issued 9/15/87, and 822,846. In those designs, various types of switches are employed to control the electric motors that drive the movable carriages. If a person actuates a switch, associated control circuitry operates to deenergize the motors and stop the carriage.

Although the prior designs have been successful, certain additional features are considered desirable for maximizing personnel safety. Thus, a need exists for improved safety devices in combination with mobile storage systems.

SUMMARY OF THE INVENTION

In accordance with the present invention, safety means is provided for controlling the movement of electrically powered movable carriages in mobile storage systems. This is accomplished by apparatus that includes a safety floor that is located between the carriage rails and that deenergizes the carriage drive motors in response to a person's presence on the floor.

The safety floor may be composed of a number of substantially identical sections. Each section comprises a flat panel that preferably extends between and is supported on its opposite ends by the rails. The panels are maintained at a slight distance above the rails by a quantity of springs. The springs are mounted to the panels by means of brackets that are attached to and extend the lengths of the panels and that lie above rail horizontal support surfaces. The springs preferably are leaf springs having first ends fixed to the brackets and free ends that are resiliently supported by the rail support surfaces.

The safety floor of the present invention further includes at least one safety switch fastened to each panel bracket. Each safety switch includes a lifter that is spaced a predetermined distance above a rail support surface. Upon deflection of the springs by a person walking onto the panel, the panel and switches approach the rail support surface. Upon contact with the rail support surface, the switch is actuated. Control circuitry in cooperation with the switch operates to deenergize the electric motors that drive the movable carriages along the rails. Consequently, a stopped movable carriage cannot be started, and a moving carriage stops when a person walks onto the safety floor.

To increase the convenience of installing and operating the present invention, the leaf springs are adjustably mounted to the panel brackets. In that manner, the undeflected distance between the switch lifters and the rail support surfaces can be controlled to suit the particular application. Spring adjustment also permits the same basic design to be used with different size panels and different weight floor coverings. To neatly protect and seal the switches, switch wires, and springs, those components are mounted in the bottom of longitudinally extending troughs formed in the brackets. A snap-in cover covers the trough of each bracket and provides easy access to the components for service.

Other aims and advantages of the invention will become apparent to those skilled in the art upon reading the disclosure.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
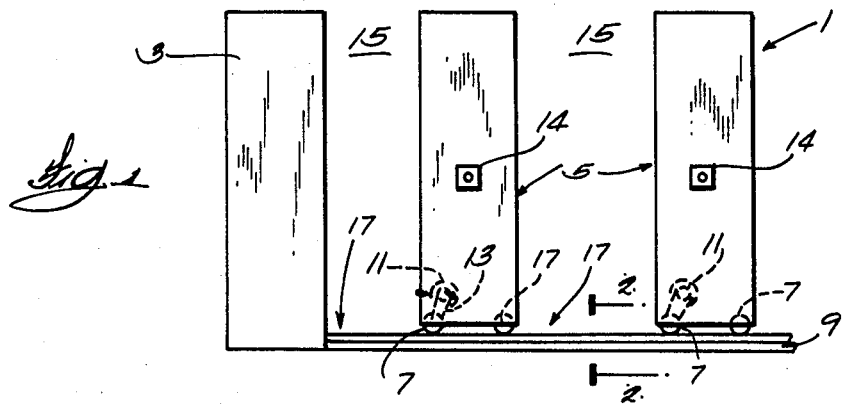
FIG. 1 is a side view of a typical mobile storage system that advantageously employs the present invention.

Referring to FIG. 1, reference numeral 1 indicates a typical electrically powered mobile storage system that includes the present invention. The mobile storage system 1 may include a stationary unit 3, together with one or more longitudinally movable carriages 5. Each movable carriage 5 is supported by wheels 7 that allow the carriage to travel along parallel rails 9. Each movable carriage is powered for movement along the rails 9 by an electric motor, schematically represented at 11, that drives the wheels 7 through a conventionally drive chain 13, as is known in the art. Movement of the carriages by means of the motors 11 is controlled by an operator's station 14 located on each carriage. Movement of the carriages creates and removes aisles 15 between the carriages.

Figure 2:
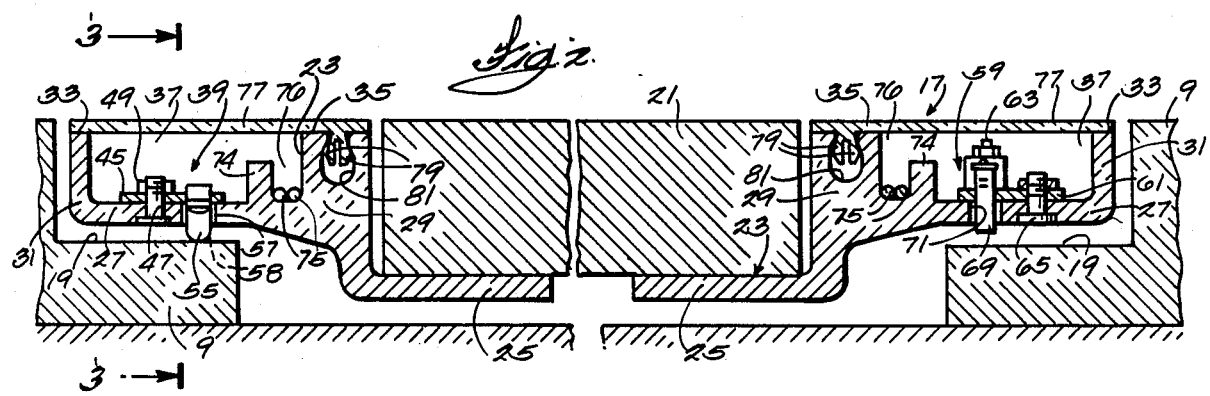
FIG. 2 is an enlarged cross-sectional view taken along lines 2—2 of FIG. 1.

In accordance with the present invention, a safety floor 17 is provided that prevents movement of the movable carriages 5 when a person is standing in an aisle 15. The safety floor 17 is comprised of a number of individual substantially identical sections. Referring to FIG. 2, each section comprises a flat panel 21 that extends transversely between the rails 9. To the bottom of each panel transverse end is attached a bracket 23. Attachment of the brackets 23 to the panels 21 may be by conventional fasteners, not shown herein. As many sections of panels and brackets as are required may be used to suit the length of the system rails.

In the preferred embodiment, each bracket 23 is fabricated with a longitudinally extending horizontal flange 25 that partially underlies and is attached to the panel 21. A horizontal leg 27, which may be vertically offset from the flange 25, is joined to the flange by a means of a central upstanding rib portion 29. The horizontal leg 27 overlies the horizontal support surface 19 of the corresponding rail 9. The free end of the horizontal leg terminates in a vertical wall 31 having a top surface 33 that is coplanar with the top surface 35 of the central rib 29. Thus, the wall 31 and central rib define a longitudinally extending trough 37.

Figure 3:
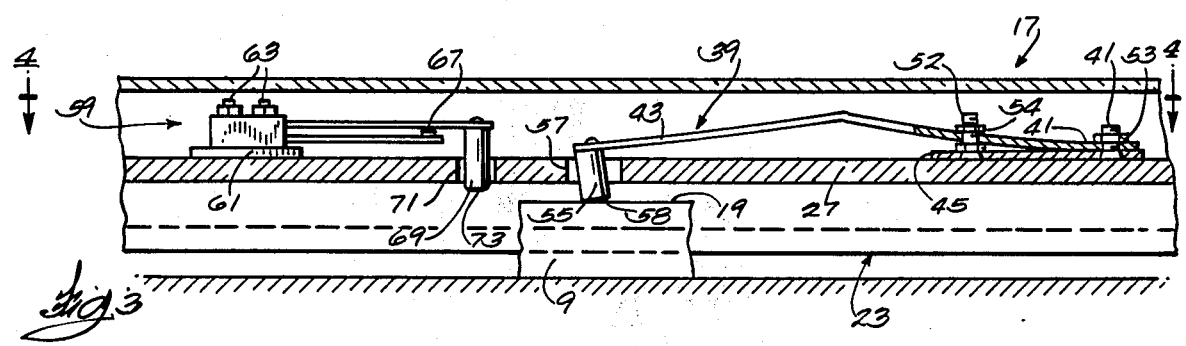
FIG. 3 is a partial cross-sectional view taken along lines 3—3 of FIG. 2.
Figure 4:
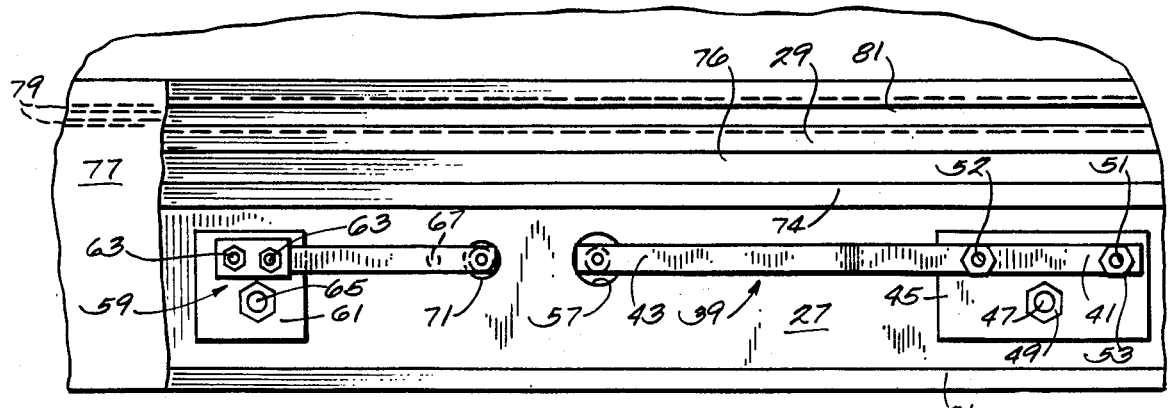
FIG. 4 is a view taken along lines 4—4 of FIG. 3.

To resiliently support the panel 21 and brackets 23 above the rail support surfaces 19, each section of the safety floor 17 includes a plurality of springs 39. As best shown in FIGS. 2 and 3, the springs 39 preferably are bent leaf springs, each having a fixed end 41 and a free end 43. Each leaf spring fixed end 41 is secured to the horizontal leg 27 of a bracket 23 by means of a plate 45. In turn, the plate 45 is joined to the bracket horizontal leg by a stud 47 and nut 49. Also see FIG. 4. Preferably, the stud 47 is pressed into the horizontal leg. The spring fixed end is secured to the plate by means of a bolt 51 and nut 53.

The free ends 43 of the springs 39 terminate in lifter pins 55 that extend through holes 57 in the bracket horizontal legs 27. The end 58 of each lifter pin 55 contacts the rail support surface 19 to support the safety floor above the rail support surfaces.

To adjust the distance of the safety floor 17 above the rail support surfaces 19, the springs 39 are provided with adjustment means. In the illustrated construction, the adjustment means comprises a bolt 52 that is attached to the plate 45 and extends through a hole in the spring near the fixed end 41. A nut 54 is turned on the bolt 52. The spring slides freely over the bolt 52 to contact the nut 54 when an upward force is applied to the lifter pin 55. Turning the nut 54 adjustably locates the lifting pin end 58 relative to the bracket 23 when the safety floor is placed on the rail support surfaces. Adjustability of the springs is important to accommodate different panel widths and floor covering weights. It has been found that two leaf springs located near each end of each bracket works satisfactorily.

The safety floor 17 of the present invention further includes a quantity of safety switches 59. Preferably, four safety switches 59 are used with each panel 21 and pair of brackets 23, with one switch being located between a pair of leaf springs 39 in each corner of the panel. Each safety switch is fastened to a plate 61 by conventional fasteners 63. The plates 61 are secured to the brackets by means of studs 65 pressed into the bracket horizontal legs 27. The safety switch is preferably of a leaf-type, having normally closed contacts 67 and lifter pins 69. The lifter pins 69 pass through suitable holes 71 in the bracket legs 27. By means of the adjustability feature provided by the bolts 52 and nuts 54 described previously in conjunction with the leaf springs 39, the undeflected distance between the ends 73 of the switch lifter pins and the rail support surfaces 19 can be preset to suit the particular application. A preset distance of approximately 0.06 inches between the switch lifter pin ends 73 and the rail support surfaces is satisfactory for most applications. An extension of approximately 0.13 inches of the spring lifting pin ends 58 beyond the bracket legs 27 is desirable. The adjustability feature of the leaf springs enables the 0.13 inches extension to be quickly and easily set regardless of panel and covering weight.

As best shown in FIG. 2, the horizontal legs 27 of each bracket 23 may be manufactured with an upstanding longitudinal ridge 74 that cooperates with the central rib portion 29 to create a channel 76. The channel 76 is adapted to receive the wires 75 connecting the safety switches 59. To provide a neat appearance to the safety floor 17 and to protect the leaf springs 39, safety switches, and switch wires 75, the troughs 37 and channels 76 are coverable with covers 77. To retain the covers 77 in place, they include a pair of longitudinally extending resilient tabs 79 that are insertable into a cooperating groove 81 formed in the top surface 35 of each central rib. The snap-in feature of the cover 77 enables easy servicing of the switches and springs.

An acceptable material for the panels 21 is plywood, which may be reinforced with steel plates. The brackets 23 may be aluminum extrusions. A preferred material for the covers 77 is a strong and tough thermosetting plastic.

Thus, it is apparent that there has been provided, in accordance with the invention, a safety floor that fully satisfies the objects and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A safety floor comprising:
   a. a flat panel having opposed ends;
   b. a pair of brackets, each bracket having a flange underlying and attached to a panel end, the bracket defining a longitudinally extending trough;
   c. a plurality of leaf springs mounted in each bracket trough, each leaf spring having a lifting pin extending through the bracket to contact a support surface below the bracket to resiliently support the safety floor above the support surface;
   d. safety switch means mounted in each bracket trough for sensing movement of the safety floor toward the support surface; and
   e. cover means for covering the bracket troughs,
   so that the safety floor deflects toward the support surface when a force is applied to the safety floor to thereby cause the support surface to actuate the safety switch means.

2. The safety floor of claim 1 wherein:
   a. each bracket comprises a horizontal leg, and a central upstanding rib portion interposed between and joined to the flange and horizontal leg, the horizontal leg terminating in a vertical wall, the central rib and vertical wall cooperating to define the longitudinally extending trough;
   b. the top surface of the central rib defines a longitudinally extending groove; and
   c. the cover means comprises a flat cover adapted to span the trough and having resilient means for insertion into the bracket central rib groove to removably retain the cover in place over the trough.

3. The safety floor of claim 2 wherein the bracket horizontal leg is vertically offset from the bracket flange.

4. The safety floor of claim 2 wherein the bracket further includes an upstanding longitudinally extending rib that is spaced from and cooperates with the central rib to define a channel adapted to receive and protect wires from the safety switch means.

5. The safety floor of claim 1 further comprising adjustment means for adjusting the leaf spring lifting pins with respect to the bracket to thereby enable the safety floor to accommodate different weight panels while maintaining a selected undeflected distance between the bracket and support surface.

6. The safety floor of claim 2 wherein:
   a. each leaf spring has a free end and a fixed end, the fixed end being fixedly secured to the bracket horizontal leg;
   b. each leaf spring free end terminates in the associated lifting pin, the lifting pin extending through a hole in the bracket horizontal leg; and
   c. the bracket horizontal leg includes adjustment means intermediate the leaf spring fixed and free ends for cooperating with the leaf spring to adjust the extension of the lifting pin through the bracket hole, so that the leaf springs can accommodate different weight panels while maintaining a selected undeflected pistance between the switch means and the brackets.

7. In combination with a mobile storage system including at least two parallel rails having horizontal support surfaces; at least one movable carriage adapted to move along the rails; and electric motor means for driving the movable carriage along the rails, a safety floor comprising:
   a. at least one flat panel extending generally between the rails;
   b. a bracket attached to each panel end and overlying a rail support surface, the bracket having a flange underlying a portion of the panel, the bracket defining a longitudinally extending trough;
   c. a plurality of leaf springs secured to the bracket within the bracket trough, each leaf spring having a lifting pin that extends through a respective hole in the bracket and contacts a rail support surface to resiliently support the safety floor above the rail support surface;
   d. a plurality of safety switches mounted within the bracket trough, each safety switch having a lifter pin that passes through a respective hole in the bracket and that is spaced a predeterminated distance above the rail support surface, the safety switches being within the electrical circuit of the motor means; and
   e. a cover removably retained on the bracket and spanning the trough to cover the leaf springs and safety switches, so that a force applied to the safety floor deflects the leaf springs to cause the rail support surface to actuate at least one safety switch and thereby control the electric motor means.

8. The combination of claim 7 wherein:
   a. each bracket is fabricated with a central upstanding rib joined to the flange and a horizontal leg joined to the central rib on the opposite side thereof as the flange;
   b. the bracket horizontal leg terminates in a vertical wall that cooperates with the central rib to define the bracket trough; and
   c. the cover is supported on the vertical wall and central rib to span and cover the trough.

9. The combination of claim 8 wherein the horizontal leg of each bracket is vertically spaced above the bracket flange to thereby enable the panel to assume a low profile between the system rails.

10. The combination of claim 7 further comprising adjustment means for adjusting the position of each leaf spring lifting pin relative to the bracket to thereby enable the leaf springs to accommodate different panel sizes and covering weights to maintain the predetermined distance between the safety switch lifter pins and the rail support surfaces.

11. The combination of claim 8 wherein:
   a. each leaf spring has a fixed end and a free end, the fixed end being fixedly secured to the bracket horizontal leg, the free end terminating in the lifting pin; and
   b. each bracket further comprises adjustment means associated with each leaf spring and located intermediate the leaf spring fixed and free ends for adjusting the extension of the lifting pin relative to the bracket horizontal leg, so that the leaf spring can be adjusted to accommodate different size panels while maintaining the predetermined distance between the safety switch lifter pins and rail support surfaces.

* * * * *